(12) United States Patent
Moeggenborg et al.

(10) Patent No.: US 7,004,819 B2
(45) Date of Patent: Feb. 28, 2006

(54) CMP SYSTEMS AND METHODS UTILIZING AMINE-CONTAINING POLYMERS

(75) Inventors: Kevin J. Moeggenborg, Naperville, IL (US); Isaac K. Cherian, Aurora, IL (US); Vlasta Brusic, Geneva, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 211 days.

(21) Appl. No.: 10/051,241

(22) Filed: Jan. 18, 2002

(65) Prior Publication Data

US 2003/0139116 A1 Jul. 24, 2003

(51) Int. Cl.
*B24B 7/22* (2006.01)

(52) U.S. Cl. .......................................... 451/41; 451/37
(58) Field of Classification Search ................... 451/41, 451/36, 37; 106/3; 252/544, 547, 155, 148; 51/308, 293
See application file for complete search history.

(56) References Cited

U.S. PATENT DOCUMENTS

| | | | |
|---|---|---|---|
| 4,452,643 A | 6/1984 | Martin et al. | |
| 4,462,188 A * | 7/1984 | Payne .......................... | 451/41 |
| 4,671,851 A | 6/1987 | Beyer et al. | |
| 4,789,648 A | 12/1988 | Chow et al. | |
| 4,910,155 A | 3/1990 | Cote et al. | |
| 4,944,836 A | 7/1990 | Beyer et al. | |
| 4,956,313 A | 9/1990 | Cote et al. | |
| 5,137,544 A | 8/1992 | Medellin | |
| 5,209,816 A | 5/1993 | Yu et al. | |
| 5,244,534 A | 9/1993 | Yu et al. | |
| 5,340,370 A | 8/1994 | Cadien et al. | |
| 5,352,277 A | 10/1994 | Sasaki | |
| 5,354,490 A | 10/1994 | Yu et al. | |
| 5,366,542 A | 11/1994 | Yamada et al. | |
| 5,391,258 A | 2/1995 | Brancaleoni et al. | |
| 5,476,606 A | 12/1995 | Brancaleoni et al. | |
| 5,527,423 A | 6/1996 | Neville et al. | |
| 5,741,626 A | 4/1998 | Jain et al. | |
| 5,770,095 A | 6/1998 | Sasaki et al. | |
| 5,860,848 A * | 1/1999 | Loncki et al. ................. | 451/36 |
| 5,876,490 A | 3/1999 | Ronay | |
| 5,968,280 A | 10/1999 | Ronay | |
| 6,099,604 A | 8/2000 | Sandhu et al. | |
| 6,290,736 B1 | 9/2001 | Evans | |
| 6,478,834 B1 * | 11/2002 | Tsuchiya et al. ............... | 51/307 |
| 6,612,911 B1 * | 9/2003 | Carter et al. ................... | 451/41 |
| 2004/0053499 A1 * | 3/2004 | Liu et al. ..................... | 438/689 |

FOREIGN PATENT DOCUMENTS

| | | | |
|---|---|---|---|
| EP | 1 118 647 A1 | 7/2001 | |
| JP | 11-302633 * | 2/1999 | .................. 451/41 |
| WO | WO 01 12739 A1 | 2/2001 | |
| WO | WO 01 12740 A1 | 2/2001 | |
| WO | WO 01/14496 A1 | 3/2001 | |
| WO | WO 01/17006 A1 | 3/2001 | |

OTHER PUBLICATIONS

US 6,331,134, 12/2001, Sachan et al. (withdrawn)

* cited by examiner

*Primary Examiner*—Robert A. Rose
(74) *Attorney, Agent, or Firm*—Caryn Borg-Breen

(57) ABSTRACT

The invention provides a chemical-mechanical polishing system and method comprising a liquid carrier, a polishing pad and/or an abrasive, and at least one amine-containing polymer, wherein the amine-containing polymer has about 5 or more sequential atoms separating the nitrogen atoms of the amino functional groups or is a block copolymer with at least one polymer block comprising one or more amine functional groups and at least one polymer block not comprising any amine functional groups.

17 Claims, No Drawings

CMP SYSTEMS AND METHODS UTILIZING AMINE-CONTAINING POLYMERS

FIELD OF THE INVENTION

This invention pertains to chemical-mechanical polishing compositions comprising amine-containing polymers.

BACKGROUND OF THE INVENTION

Integrated circuits are made up of millions of active devices formed in or on a substrate, such as a silicon wafer. The active devices are chemically and physically connected into a substrate and are interconnected through the use of multilevel interconnects to form functional circuits. Typical multilevel interconnects comprise a first metal layer, an interlevel dielectric layer, and sometimes a third and subsequent metal layer. Interlevel dielectrics, such as doped and undoped silicon dioxide ($SiO_2$) and/or low-κ dielectrics, are used to electrically isolate the different metal layers.

The electrical connections between different interconnection levels are made through the use of metal vias. U.S. Pat. No. 5,741,626, for example, describes a method for preparing dielectric TaN layers. Moreover, U.S. Pat. No. 4,789,648 describes a method for preparing multiple metallized layers and metallized vias in insulator films. In a similar manner, metal contacts are used to form electrical connections between interconnection levels and devices formed in a well. The metal vias and contacts may be filled with various metals and alloys, such as, for example, titanium (Ti), titanium nitride (TiN), aluminum copper (Al—Cu), aluminum silicon (Al—Si), copper (Cu), tungsten (W), platinum (Pt), ruthenium (Ru), iridium (Ir), and combinations thereof (hereinafter referred to as "via metals").

The via metals generally employ an adhesion layer (i.e., a barrier film), such as a titanium (Ti), titanium nitride (TiN), tantalum (Ta), tantalum nitride (TaN), tungsten (W), or tungsten nitride (WN) barrier film, to adhere the via metals to the $SiO_2$ substrate. At the contact level, the barrier film acts as a diffusion barrier to prevent the via metals from reacting with $SiO_2$.

In one semiconductor manufacturing process, metal vias and/or contacts are formed by a blanket metal deposition followed by a chemical-mechanical polishing (CMP) step. In a typical process, via holes are etched through an interlevel dielectric (ILD) to interconnection lines or to a semiconductor substrate. Next, a barrier film is formed over the ILD and is directed into the etched via hole. Then, a via metal is blanket-deposited over the barrier film and into the via hole. Deposition is continued until the via hole is filled with the blanket-deposited metal. Finally, the excess metal is removed by a CMP process to form metal vias. Processes for the manufacturing and/or CMP of vias are disclosed in U.S. Pat. Nos. 4,671,851, 4,910,155, and 4,944,836.

Typical metal CMP systems contain an abrasive material, such as silica or alumina, suspended in an oxidizing, aqueous medium. U.S. Pat. No. 5,244,534, for example, discloses a system containing alumina, hydrogen peroxide, and either potassium or ammonium hydroxide, which is useful in removing tungsten with little removal of the underlying insulating layer. U.S. Pat. No. 5,209,816 discloses a system useful for polishing aluminum that comprises perchloric acid, hydrogen peroxide, and a solid abrasive material in an aqueous medium. U.S. Pat. No. 5,340,370 discloses a tungsten polishing system comprising potassium ferricyanide, potassium acetate, acetic acid, and silica. U.S. Pat. Nos. 5,391,258 and 5,476,606 disclose systems for polishing a composite of metal and silica including an aqueous medium, abrasive particles, and an anion, which controls the rate of silica removal. U.S. Pat. No. 5,770,095 discloses polishing systems comprising an oxidizing agent, a chemical agent, and an etching agent selected from aminoacetic acid and amidosulfuric acid. U.S. Pat. No. 6,290,736 discloses a polishing composition for polishing a noble metal surface comprising an abrasive, a halogen compound, and an aqueous basic solution. Other polishing systems for use in CMP processes are described in U.S. Pat. Nos. 4,956,313, 5,137,544, 5,157,876, 5,354,490, and 5,527,423.

Barrier films of titanium, titanium nitride, and like metals, such as tungsten, have a chemical activity similar to that of the via metals. Consequently, a single system can be used effectively to polish both Ti/TiN barrier films and via metals at similar rates. Ta and TaN barrier films, however, are significantly different from Ti, TiN, and like barrier films. Ta and TaN are relatively inert in chemical nature as compared to Ti and TiN. Accordingly, the aforementioned systems are significantly less effective at polishing tantalum layers than they are at polishing titanium layers (e.g., the tantalum removal rate is significantly lower than the titanium removal rate). While via metals and barrier metals are conventionally polished with a single system due to their similarly high removal rates, joint polishing of via metals and tantalum and similar materials using conventional polishing systems results in undesirable effects, such as oxide erosion and via metal dishing.

Similar problems with oxide erosion are observed when noble metals are used as the via metal. Noble metals have significantly lower chemical activity and are not adequately polished by conventional CMP compositions. Efficient planarization of noble metals often requires a CMP composition with an alkaline pH, resulting in undesirably higher removal rates of the oxide layer.

Consequently, there remains a need for a system, composition, and/or method of polishing a substrate comprising a first metal layer and a second layer in a manner such that planarization efficiency, uniformity, and removal rate of the first metal layer are maximized and planarization of the second layer is minimized, thereby minimizing undesirable effects, such as first metal layer dishing, surface imperfections, and damage to underlying topography. The invention provides such a system, composition, and method. These and other characteristics and advantages of the invention will be apparent from the description of the invention provided herein.

BRIEF SUMMARY OF THE INVENTION

The invention provides a chemical-mechanical polishing system comprising a liquid carrier, a polishing pad and/or an abrasive, and at least one amine-containing polymer with about 5 or more sequential atoms separating the nitrogen atoms of the amino functional groups. The invention also provides a chemical-mechanical polishing system comprising a liquid carrier, a polishing pad and/or an abrasive, and at least one amine-containing block copolymer with at least one polymer block comprising one or more amine functional groups and at least one polymer block not comprising any amine functional groups. The invention further provides a chemical-mechanical polishing method that utilizes the inventive CMP system to polish a substrate.

DETAILED DESCRIPTION OF THE INVENTION

The chemical-mechanical polishing system of the invention comprises a liquid carrier, a polishing pad and/or an abrasive, and at least one amine-containing polymer. The amine-containing polymer can be (1) an amine-containing polymer with about 5 or more sequential atoms separating the nitrogen atoms of the amino functional groups and/or (2) an amine-containing block copolymer with at least one polymer block comprising one or more amine functional groups and at least one polymer block not comprising any amine functional groups.

The liquid carrier, abrasive (when present and suspended in the liquid carrier), and amine-containing polymer, as well as any other components suspended in the liquid carrier, form the polishing composition of the CMP system.

The chemical-mechanical polishing system comprises an abrasive, a polishing pad, or both. Preferably, the CMP system comprises both an abrasive and a polishing pad. The abrasive can be fixed on the polishing pad and/or can be in particulate form and suspended in the liquid carrier. The polishing pad can be any suitable polishing pad.

The abrasive can be any suitable abrasive, many of which are known in the art. For example, the abrasive can be natural or synthetic and can comprise diamond (e.g., polycrystalline diamond), garnet, glass, carborundum, metal oxide, nitride (e.g., silicon nitride), carbide (e.g., silicon carbide, boron carbide, titanium carbide, tungsten carbide), polymer, composite (e.g., polymer composite or polymer/metal oxide composite), coated particle abrasives, and the like. The choice of abrasive can depend on the particular nature of the substrate being polished. The abrasive preferably comprises metal oxide, diamond, silicon carbide, silicon nitride, boron nitride, or combinations thereof. The metal oxide desirably is selected from the group consisting of alumina, silica, titania, ceria, zirconia, germania, magnesia, co-formed products thereof, and combinations thereof. More preferably, the abrasive is alumina, silicon carbide, titanium carbide, boron carbide, or silicon nitride.

When the abrasive is present in the CMP system and is suspended in the liquid carrier (i.e., when the abrasive is a component of the polishing composition), any suitable amount of abrasive can be present in the polishing composition. Typically, about 0.1 wt. % or more (e.g., about 0.5 wt. % or more) abrasive will be present in the polishing composition. More typically, about 1 wt. % or more abrasive will be present in the polishing composition. The amount of abrasive in the polishing composition typically will not exceed about 30 wt. %, more typically will not exceed about 20 wt. % (e.g., will not exceed about 10 wt. %).

A liquid carrier is used to facilitate the application of the abrasive (when present), amine-containing polymer, and any other additives to the surface of a suitable substrate to be polished or planarized. The liquid carrier can be any suitable liquid carrier. Typically, the liquid carrier is water, a mixture of water and a suitable water-miscible solvent, or an emulsion. Preferably, the liquid carrier comprises, consists essentially of, or consists of water, more preferably deionized water.

In a first embodiment, the amine-containing polymer preferably has 5 or more sequential atoms separating the nitrogen atoms of the amino functional groups. For example, the amine-containing polymer can have about 7 or more (e.g., about 10 or more) sequential atoms separating the nitrogen atoms of the amino functional groups. Thus, amine-containing polymers like polyvinylamine and polyethylenimine (each having 3 sequential atoms separating the nitrogen atoms of the amino functional groups) do not qualify as such an amine-containing polymer. The amine-containing polymer can be a condensation polymer comprising repeating units that contain an amino functional group (e.g., a polyaminoamide). Such condensation polymers can be prepared by reaction of a polyamine monomer with a diacid monomer. Preferably, the condensation copolymer is a diethylenetriamine/adipic acid condensation copolymer. The amine-containing polymer also can be polydiallyldimethylammonium chloride or a copolymer comprising repeating units containing one or more amine functional groups and repeating units selected from the group consisting of amides, vinyl acetate, vinyl alcohol, ethylene oxide, and propylene oxide. For example, the amine-containing polymer can be a copolymer of vinylamine and vinyl alcohol.

In a second embodiment, the amine-containing polymer is a block copolymer with at least one polymer block comprising one or more amine functional groups and at least one polymer block not comprising any amine functional groups. The amine-containing block copolymer can be an AB diblock, ABA triblock, or ABC triblock copolymer. The amine-containing block copolymer can also be a graft copolymer. Typically, the polymer blocks comprising one or more amine functional groups are about 10 wt. % or more of the amine-containing block copolymer. Preferably, the polymer blocks comprising one or more amine functional groups are about 20 wt. % or more (e.g., about 40% or more) of the amine-containing block copolymer. The amine-containing block can be any amine-containing polymer block and can have about 3 or more (e.g., about 5 or more) sequential atoms separating the nitrogen atoms of the amino functional groups.

The amine-containing polymers of the first and second embodiments are intended to act as "stopping compounds" that slow the removal of a substrate layer (e.g., metal or silicon-based insulating layer) that underlies a substrate layer to be removed by chemical-mechanical polishing. The polymers adhere to the surface of the underlying substrate layer through the amine functional groups. The introduction of spacer atoms or repeating units between the amine-functional groups is intended to improve the "stopping" properties of the polymer. While not wishing to be bound to any particular theory, amine-containing polymers with such additional "space" are believed to generate a thicker polymer film on the surface of the underlying (e.g., oxide insulating) layer, thus further reducing the removal rate of such an underlying layer while not affecting the removal rate of other (e.g., metal) layers. The additional space is introduced either between each amine functional group (in accordance with the first embodiment), between blocks of amine functional groups (in accordance with the second embodiment), or both.

The chemical-mechanical polishing composition optionally further comprises an oxidizer. The oxidizer desirably is an iodate salt or a per-type oxidizer, including inorganic or organic per-compounds. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. Preferably, the per-type oxidizer is selected from the group consisting of peroxides, persulfates, periodates, and permanganates. The per-type oxidizer may be used in conjunction with any other oxidizer, including metal compounds (e.g., iron salts).

The chemical-mechanical polishing composition optionally further comprises a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or poly-alcohols (e.g., ethylene glycol, pyrocatechol, pyrogallol, tannic acid, and the like) and amine-containing compounds (e.g., ammonia, amino acids, amino alcohols, di-, tri-, and polyamines, and the like). Preferably, the complexing agent is a carboxylate salt, more preferably an oxalate salt. The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof, phthalates include phthalic acid, as well as mono-salts (e.g., potassium hydrogen phthalate) and di-salts thereof, perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The chemical-mechanical polishing system optionally further comprises a surfactant. Suitable surfactants can include, for example, cationic surfactants, anionic surfactants, nonionic surfactants, amphoteric surfactants, mixtures thereof, and the like. A preferred surfactant is Triton DF-16.

The chemical-mechanical polishing system can have any pH suitable for its intended end-use. The CMP system desirably has a pH in the range of about 2 to about 12 depending on the type of substrate to be polished. The CMP system can have a pH of less than about 7 (e.g., less than about 6, about 2 to about 5, or about 3 to about 4.5) or a pH of greater than about 7 (e.g., about 8 to about 14, about 9 to about 13, or about 10 to about 12). When the CMP system is used to polish a copper-containing substrate, the pH preferably is about 4 to about 8. When the CMP system is used to polish a tantalum-containing substrate, the pH preferably is about 8 to about 11. When the CMP system for tantalum polishing further comprises an oxidizer, the pH preferably is about 4 to about 7. When the CMP system is used to polish a substrate layer comprising tungsten, the pH preferably is about 1.5 to about 5. When the CMP system is used to polish a platinum-containing substrate, the pH preferably is about 2 to about 7. When the CMP system is used to polish a ruthenium-containing substrate, the pH preferably is about 5 or more (e.g., about 7 to about 11). When the CMP system is used to polish an iridium-containing substrate, the pH preferably is about 5 to about 12 (e.g., about 7 to about 9).

The CMP system desirably is used in a method of polishing a substrate comprising at least one metal layer and a second (e.g., an insulating or metal) layer, wherein the first and second layers are not the same. The substrate is contacted with the chemical-mechanical polishing system, and at least a portion of the substrate (preferably the metal layer of the substrate) is abraded such that the substrate is polished. The substrate can be any suitable substrate (e.g., an integrated circuit, memory or rigid disk, metal, ILD layer, semiconductor, microelectromechanical system, ferroelectric, magnetic head, polymeric film, and low or high dielectric film) and can contain any suitable metal or metal alloy (e.g., metal conductive layer). For example, the metal can be copper, tantalum, tungsten, titanium, aluminum, or nickel. The CMP system is particularly well suited for polishing noble metal-containing substrates, especially those used in the electronics industry. The substrate preferably comprises a noble metal selected from the group consisting of rhenium, ruthenium, rhodium, palladium, silver, osmium, iridium, platinum, and gold. In a more preferred embodiment, the noble metal is platinum, ruthenium, or iridium. Noble metal layers tend to be mechanically hard and chemically resistant, and the removal rates for the underlying (e.g., insulating layer such as oxide) are often high under the conditions required to remove the noble metal. The amine-containing polymer(s) of the CMP system desirably protect(s) the underlying (e.g., insulating such as oxide) layer of a substrate comprising a noble metal layer, while maintaining a high removal rate with respect to the noble metal layer. For example, using the CMP system of the invention, good selectivity (greater than about 10:1) of platinum removal relative to underlying oxide removal can be achieved. In the case of non-noble metals, the selectivity of the metal layer to the underlying substrate layer can be about 30:1 or higher (or even about 50:1 or higher).

EXAMPLE

This example further illustrates the invention but, of course, should not be construed as in any way limiting its scope. This example demonstrates the effect of amine-containing polymers of the CMP system on the selectivity of metal to oxide removal rate.

Similar substrates comprising platinum and silicon oxide layers were polished with seven different chemical mechanical polishing systems, each of which comprised the same polishing pad in conjunction with a different polishing composition (Polishing Compositions 1A–1G). Polishing Composition 1A (control) comprised 8 wt. % alumina abrasive and 1 wt. % hydrogen peroxide with no amine-containing polymer. Polishing Compositions 1B–1G were the same except that they further comprised an amine-containing polymer. Polishing Composition 1B and 1C (comparative) comprised 1 wt. % of polyethylenimine (MW=20,000) and polyethylenimine (MW=80,000), respectively. Polishing Composition 1D (invention) comprised 1 wt. % poly(diallyldimethylammonium chloride). Polishing Compositions 1E, 1F, and 1G (invention) comprised 1 wt. % polyaminoamide (MW=10,000), 0.1 wt. % polyaminoamide (MW=10,000), and 1 wt. % polyaminoamide (MW=80,000), respectively. The removal rates for the platinum and silicon oxide layer of the substrates were measured for each of the chemical-mechanical polishing systems. The removal rates (RR) and selectivities are recited in the following Table:

TABLE

Platinum Removal Rates and Platinum/Oxide Selectivities

| Polishing Composition | Amine-Containing Polymer | Amount (wt. %) | Pt RR (Å/min) | Pt/Oxide Selectivity |
|---|---|---|---|---|
| 1A (control) | None | — | 982 | 1.75 |
| 1B (comparative) | polyethylenimine (MW = 20,000) | 1.0 | 1060 | 17.7 |
| 1C (comparative) | polyethylenimine (MW = 80,000) | 1.0 | 1380 | 11.0 |
| 1D (invention) | poly(diallyldimethyl-ammonium chloride) | 1.0 | 540 | 13.5 |
| 1E (invention) | polyaminoamide (MW = 10,000) | 1.0 | 982 | 17.8 |
| 1F (invention) | polyaminoamide (MW = 10,000) | 0.1 | 1183 | 22.8 |
| 1G (invention) | polyaminoamide (MW = 80,000) | 1.0 | 450 | 50.0 |

These results demonstrate that improved metal to oxide selectivity can be achieved using a CMP system comprising an amine-containing polymer in accordance with the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chemical-mechanical polishing system comprising:
   (a) a liquid carrier,
   (b) a polishing component selected from the group consisting of (i) a polishing pad, (ii) an abrasive, and (iii) a polishing pad and an abrasive, and
   (c) at least one amine-containing polymer with 5 or more sequential atoms separating the nitrogen atoms of the amine functional groups.

2. The system of claim 1, wherein at least one amine-containing polymer is a condensation polymer comprising repeating units that contain an amino functional group.

3. The system of claim 2, wherein the condensation polymer is a polyaminoamide.

4. The system of claim 3, wherein the condensation polymer is a dietylenetriamine/adipic acid condensation polymer.

5. A chemical-mechanical polishing system comprising:
   (a) a liquid carrier,
   (b) a polishing component selected from the group consisting of (i) a polishing pad, (ii) an abrasive, and (iii) a polishing pad and an abrasive, and
   (c) at least one amine-containing polymer with 5 or more sequential atoms separating the nitrogen atoms of the amino functional groups,
   wherein at least one amine-containing polymer is polydiallyldimethylammonium chloride.

6. A chemical-mechanical polishing system comprising:
   (a) a liquid carrier,
   (b) a polishing component selected from the group consisting of (i) a polishing pad, (ii) an abrasive, and (iii) a polishing pad and an abrasive, and
   (c) at least one amine-containing polymer with 5 or more sequential atoms separating the nitrogen atoms of the amino functional groups,
   wherein at least one amine-containing polymer is a copolymer comprising repeating units containing an amine functional group and repeating units selected from the group consisting of amides, vinyl acetate, ethylene oxide, and propylene oxide.

7. The system of claim 1, wherein at least one amine-containing polymer has about 7 or more sequential atoms separating the nitrogen atoms of the amino functional groups.

8. The system of claim 1, wherein at least one amine-containing polymer has about 10 or more sequential atoms separating the nitrogen atoms of the amino functional groups.

9. The system of claim 1, further comprising a per-type oxidizer.

10. The system of claim 9, wherein the per-type oxidizer is selected from the group consisting of peroxides, persulfates, periodates, and permanganates.

11. The system of claim 1, further comprising a complexing agent.

12. A chemical-mechanical polishing system comprising:
    (a) a liquid carrier,
    (b) a polishing component selected from the group consisting of (i) a polishing pad, (ii) an abrasive, and (iii) a polishing pad and an abrasive, and
    (c) at least one amine-containing block copolymer with at least one polymer block comprising one or more amine functional groups and at least one polymer block not comprising any amine functional groups.

13. The system of claim 12, wherein at least one amine-containing block copolymer is an AB diblock, ABA triblock, or ABC triblock copolymer.

14. The system of claim 12, wherein the polymer blocks comprising one or more amine functional groups are about 10 wt. % or more of the amine-containing block copolymer.

15. The system of claim 14, wherein the polymer blocks comprising one or more amine functional groups are about 20 wt. % or more of the amine-containing block copolymer.

16. The system of claim 12, wherein the polymer block comprising one or more amine functional groups are about 40 wt. % or more of the amine-containing block copolymer.

17. The system of claim 12, wherein at least one amine-containing block has about 5 or more sequential atoms separating the nitrogen atoms of the amino functional groups.

* * * * *